United States Patent Office 3,093,455
Patented June 11, 1963

3,093,455
STABILIZATION OF SULFUR TRIOXIDE AND HIGH STRENGTH OLEUMS
James R. Jones, Tonawanda, and Russell F. Fogle, Jr., Niagara Falls, N.Y., assignors to Olin Mathieson Chemical Corporation, a corporation of Virginia
No Drawing. Filed Mar. 21, 1958, Ser. No. 722,829
21 Claims. (Cl. 23—167)

This invention relates to the stabilization of sulfur trioxide and high strength oleums.

Three sulfur trioxide polymers are known to form in sulfur trioxide and in high strength oleums. They are commonly denoted as alpha, beta and gamma. The melting points of these polymers, are, respectively, 62° C., 33° C., and 17° C. It is advantageous to stabilize and thereby inhibit polymerization of sulfur trioxide to the alpha and beta forms as liquefaction of these polymers is not easily accomplished, and liquefaction of the alpha polymer is hazardous due to the sudden increase in vapor pressure which occurs at the melting temperature. Heretofore, nitrosyl compounds, boron compounds and carbon tetrachloride have been used to stabilize sulfur trioxide and high strength oleums.

The present invention provides the art with another means whereby stabilized sulfur trioxide and high strength oleum compositions can be prepared. Thus, we have discovered that sulfur trioxide and oleum of at least about 80% strength can be stabilized by incorporating therein not more than 2% by weight and preferably 0.1% to 1.0% by weight of certain oxygenated aromatic compounds. As little as about 0.01% by weight is satisfactory in some circumstances. Accordingly, the present invention provides a method of stabilizing sulfur trioxide and high strength oleum, and also provides a stabilized sulfur trioxide and a stabilized high strength oleum composition. The method of the invention comprises adding to sulfur trioxide or oleum of at least about 80% strength not more than 2% by weight of the aromatic compound. It is not known whether the aromatic compound is present as such in the compositions of the invention or whether it is present therein as a reaction product or products of the aromatic compound and sulfur trioxide. Hence, the composition of the invention can best be defined as sulfur trioxide or oleum of at least about 80% strength which has been stabilized by the addition thereto of not more than 2% by weight of the aromatic compound.

Many non-aromatic and many aromatic organic compounds were tested as sulfur trioxide stabilizers. The non-aromatic organic compounds were found to be either useless or effective only to prevent the formation of the alpha polymer. In those cases in which non-aromatic organic compounds did inhibit polymerization, the effect was temporary as only a trace of moisture would bring about complete polymerization to the alpha form. The oxygenated aromatic compounds, on the other hand, all inhibited the formation of the alpha polymer, and about 80% of the aromatic compounds tested inhibited the formation of the beta polymer. Moreover, sulfur trioxide or high strength oleum stabilized with the aromatic compounds was found to be substantially more resistant to the action of moisture than was the sulfur trioxide stabilized with non-aromatic compounds. Further, when kept in moisture proof containers, sulfur trioxide or high strength oleum treated according to the invention with aromatic compounds which inhibit the formation of the alpha and beta polymers can be stored at normal atmospheric temperatures without either of these polymers being formed. The compositions of the invention, however, will polymerize upon prolonged exposure to atmospheric moisture so that this should be avoided.

The aromatic compounds useful in this invention are oxygenated aromatic compounds and more particularly aromatic aldehydes, aromatic ketones, phenols, and aromatic acids and their esters and anhydrides.

The aromatic aldehydes include, for example, benzaldehyde, m-hydroxy-benzaldehyde, o-methoxybenzaldehyde and o-tolualdehyde. The aromatic ketones include, for example, quinone, benzophenone, acetophenone and fluorenone. The phenols include, for example, phenol, the cresols such as o- and m-cresol, the xylenols such as 2,3- and 3,4-xylenol, the quinols such as 1,2-, 1,3- and 1,4-dihydroxybenzene (hydroquinone) and the trihydroxybenzenes such as 1,2,3-, 1,2,4- and 1,3,5-trihydroxybenzene. The aromatic acids include aromatic carboxylic acids and their esters and anhydrides, aromatic sulfonic acids and phosphonic acids. The aromatic carboxylic acids and their esters and anhydrides include benzoic acid, phenyl acetic acid, o-phthalic acid, o-phthalic anhydride, terephthalic acid, isophthalic acid and benzoyl benzoic acid. The aromatic sulfonic acids include, for example, p-toluene sulfonic acid, benzene sulfonic acid, naphthalene-1-sulfonic acid and naphthalene-2-sulfonic acid. The aromatic phosphonic acids include, for example, benzene phosphonic acid. Preferably, in the above compounds, the alkyl group contains from 1 to 4 carbon atoms.

The oxygenated aromatic compounds can be represented by the following formula

$$Ar-X_n$$

wherein Ar is an aryl nucleus of 6 to 14 ring carbon atoms, e.g. phenyl, diphenyl, and fused ring aromatics of 10 to 14 ring carbon atoms, e.g. naphthyl, tetrahydronaphthyl, fluorenyl, anthryl and phenanthryl, and the alkyl and alkoxy substituted derivatives thereof; X is phosphonic ($-PO_3H_2$), sulfonic ($-SO_3H_2$), hydroxy ($-OH$) or $-COR$ wherein R is hydrogen (aldehydes), hydroxy (acids), alkyl or aryl (ketones) or alkoxy (esters); and $n$ is 1 to 14 depending on the number of ring carbon atoms in the Ar nucleus, i.e. 1 to 6 when Ar has 6 ring carbon atoms or greater when Ar has more than 6 ring carbon atoms, i.e. is a polynuclear aryl nucleus; with the proviso that when Ar is fluorenyl, X can be Oxo ($=O$) attached to the carbon atom bridging the two benzene rings (fluorenone). When $n$ is more than 1, X can be the same or different. The anhydrides of the compounds of the above formula when X is $-COOH$ are also useful. Also, quinone which does not fall within the above formula is useful.

In the practice of the invention, the oxygenated aromatic used can be added to liquid sulfur trioxide or high strength oleum. A small amount of sludge or oily liquid as a second phase frequently forms in the resulting solution (i.e. treated sulfur trioxide or high strength oleum) and depending on the aromatic compound used, color may be imparted to the solution. If desired, the sludge or oily liquid can be removed by any suitable means. Thus, sludge may be removed by filtration or oily liquid may be separated from the solution by decantation. However, whether the sludge or oily liquid is removed or not, the treated sulfur trioxide or high strength oleum is effectively stabilized.

Benzoic acid is a particularly desirable stabilizer. It also does not color the solution and forms a small amount of oily liquid which settles quickly. In general, the less completely aromatic the stabilizing agent and the larger the non-aromatic groups thereof, the greater is the amount of sludge formation and the lower is the degree of stabilization. Complete substitution for the hydrogen of the aromatic nucleus of nuclei is preferably avoided.

The method of this invention also includes adding one of the defined aromatic compounds to the sulfur trioxide and oleum, separating sulfur trioxide from the resulting mixture and adding some of the resulting residue to the material to be stabilized, the total amount of aromatic compound added being not more than 2% by weight based on the weight of the finally stabilized composition.

The following examples describe specific embodiments of the invention.

Example 1

Three-tenths of a gram of benzoic acid was placed in a receiving tube and 51.4 grams of liquid sulfur trioxide was condensed therein. The composition contained 0.58 percent of benzoic acid. The sample was frozen in Dry Ice and placed in a water bath at 15 to 17° C. The sample melted completely showing stabilization of the sulfur trioxide.

Example 2

Three-tenths of a gram of p-toluene sulfonic acid was placed in a receiving tube and 57.8 grams of sulfur trioxide was liquefied in the same tube. The clear solution was frozen in Dry Ice and then placed in a water bath at 15 to 17° C. The composition melted completely showing that the polymerization of the sulfur trioxide was prevented.

Example 3

Three-tenths of a gram of benzene phosphonic acid was placed in a receiving tube and 61.3 grams of liquid sulfur trioxide was introduced to provide a water-clear composition containing 0.487 percent of benzene phosphonic acid. The sample was frozen in Dry Ice and placed in a water bath at 15 to 17° C. It melted completely without any residue of sulfur trioxide polymer.

Example 4

61 grams of liquid sulfur trioxide was transferred to a testing vial containing 0.3 gram of benzene phosphonic acid. This amount of benzene phosphonic acid is 0.49% by weight of the sulfur trioxide. The mixture was sealed in a testing vial, frozen in contact with Dry Ice, and remelted in a 17° C. water bath. The sample was then refrozen in a Dry Ice-acetone bath and maintained at that temperature (−78° C.) for 100 hours. After this prolonged, low-temperature treatment, 70 percent of the sample remelted at 17° C., while 30 percent had polymerized to higher melting forms.

Example 5

Three-tenths of a gram of benzaldehyde was placed in a receiving tube and 68.8 grams of liquid sulfur trioxide was condensed therein to form a composition containing 0.435 percent of benzaldehyde. The sample was frozen in Dry Ice and then placed in a water bath at 15 to 17° C. The sample melted completely showing that the sulfur trioxide was stabilized.

Example 6

Three-tenths of a gram of quinone was placed in a receiver into which was condensed 72.1 grams of sulfur trioxide. The liquid composition contained 0.416 percent of quinone. The sample was frozen in Dry Ice and placed in a water bath at 15 to 17° C. at which temperature it melted without any solid residue. The sulfur trioxide was thus completely stabilized.

Example 7

Three-tenths of a gram of hydroquinone was placed in a glass tube and 50.9 grams of liquid sulfur trioxide was condensed in the same tube. The sample was frozen in Dry Ice and then placed in a water bath at 15 to 17° C. The composition contained 0.59 percent of hydroquinone. The sample melted but not completely indicating partial stabilization.

Example 8

About 0.2 gram of o-phthalic anhydride was placed in a glass vial with 54.8 grams of SO₃. The vial was sealed, shaken, and placed in a Dry Ice-acetone bath until its contents were frozen. All of the SO₃ melted completely when the vial was placed in a water bath maintained at 15 to 17° C.

Example 9

A mixture comprising 0.5 gram of o-phthalic anhydride and 65 grams of sulfur trioxide was distilled under a vacuum (10 mm. Hg) until 64 grams of sulfur trioxide was removed. The resulting residue was mixed with 65 grams of fresh, unstabilized sulfur trioxide. This mixture was sealed in a testing vial, frozen in a Dry Ice-acetone bath, and completely remelted in a 15 to 17° C. water bath.

The sulfur trioxide used in the foregoing examples was substantially pure sulfur trioxide such as may be obtained by distillation of say 30% oleum, or by compression and condensation of sulfur trioxide from a mist free sulfur dioxide-sulfur trioxide gas mixture obtained from a sulfur dioxide converter.

The sulfur trioxide composition of the invention can be used in a wide variety of organic sulfonations and sulfations. For example, sulfur trioxide stabilized with phthalic anhydride according to the invention may be used to sulfate stearyl alcohol.

This application is a continuation-in-part of pending application Serial No. 561,364, filed January 25, 1956, now abandoned.

What is claimed is:

1. The method of stabilizing material selected from the group consisting of liquid sulfur trioxide and oleum of at least about 80% strength which comprises adding thereto in an amount at least effective to stabilize the sulfur trioxide and oleum but not more than 2% by weight of an oxygenated aromatic compound selected from the group consisting of aryl aldehydes, aryl ketones, aryl hydroxides, aryl carboxylic acids and their anhydrides and alkyl esters in which the alkyl group contains from 1 to 4 carbon atoms, aryl sulfonic acids and aryl phosphonic acids, wherein the aryl group of the said aldehydes, ketones, carboxylic acids, esters, anhydrides, sulfonic acids and phosphonic acids is selected from the group consisting of phenyl, alkylphenyl in which the alkyl group contains from 1 to 4 carbon atoms, alkoxyphenyl in which the alkyl group contains from 1 to 4 carbon atoms, hydroxyphenyl, oxyphenyl, naphthyl and fluorenyl.

2. The method of claim 1 wherein said compound is added to liquid sulfur trioxide.

3. The method of stabilizing liquid sulfur trioxide which comprises adding thereto 0.1% to 1% by weight of benzoic acid.

4. The method of stabilizing liquid sulfur trioxide which comprises adding thereto 0.1% to 1% by weight of phthalic anhydride.

5. The method of stabilizing liquid sulfur trioxide which comprises adding thereto 0.1% to 1% by weight of hydroquinone.

6. The method of stabilizing liquid sulfur trioxide which comprises adding thereto 0.1% to 1% by weight of p-toluene sulfonic acid.

7. The method of stabilizing liquid sulfur trioxide which comprises adding thereto 0.1% to 1% by weight of benzene phosphonic acid.

8. The method of stabilizing material selected from the group consisting of liquid sulfur trioxide and oleum of at least about 80% strength which comprises adding an oxygenated aromatic compound thereto, separating sulfur trioxide from the resulting mixture and adding some of the residue remaining after separation of the sulfur trioxide to the material to be stabilized, the total amount of said aromatic compound added being in an amount at least effective to stabilize the sulfur trioxide and oleum but not more than 2% by weight based upon the weight of the finally stabilized composition, said oxygenated aromatic compound being selected from the group consisting of aryl aldehydes, aryl ketones, aryl hydroxides, aryl carboxylic acids and their anhydrides and alkyl esters in which the alkyl group contains from 1 to 4 carbon atoms, aryl sulfonic acids and aryl phosphonic acids, wherein the aryl group of the said aldehydes, ketones, carboxylic acids, esters, anhydrides, sulfonic acids and phosphonic acids is selected from the group consisting of phenyl, alkylphenyl in which the alkyl group contains from 1 to 4 carbon atoms, alkoxyphenyl in which the alkyl group contains from 1 to 4 carbon atoms, hydroxyphenyl, oxyphenyl, naphthyl and fluorenyl.

9. A stabilized composition consisting essentially of material selected from the group consisting of liquid sulfur trioxide and oleum of at least about 80% strength, said material having been stabilized by the addition thereto of an amount at least effective to stabilize the sulfur trioxide and oleum but not more than 2% by weight of an oxygenated aromatic compound selected from the group consisting of aryl aldehydes, aryl ketones, aryl hydroxides, aryl carboxylic acids and their anhydrides and alkyl esters in which the alkyl group contains from 1 to 4 carbon atoms, aryl sulfonic acids and aryl phosphonic acids, wherein the aryl group of the said aldehydes, ketones, carboxylic acids, esters, anhydrides, sulfonic acids and phosphonic acids is selected from the group consisting of phenyl, alkylphenyl in which the alkyl group contains from 1 to 4 carbon atoms, alkoxyphenyl in which the alkyl group contains from 1 to 4 carbon atoms, hydroxyphenyl, oxyphenyl, naphthyl and fluorenyl.

10. A stabilized liquid sulfur trioxide composition consisting essentially of liquid sulfur trioxide stabilized by the addition thereto of 0.1% to 1% of benzoic acid.

11. A stabilized liquid sulfur trioxide composition consisting essentially of liquid sulfur trioxide stabilized by the addition thereto of 0.1% to 1% of phthalic anhydride.

12. A stabilized liquid sulfur trioxide composition consisting essentially of liquid sulfur trioxide stabilized by the addition thereto of 0.1% to 1% of hydroquinone.

13. A stabilized liquid sulfur trioxide composition consisting essentially of liquid sulfur trioxide stabilized by the addition thereto of 0.1% to 1% of p-toluene sulfonic acid.

14. A stabilized liquid sulfur trioxide composition consisting essentially of liquid sulfur trioxide stabilized by the addition thereto of 0.1% to 1% of benzene phosphonic acid.

15. The method of stabilizing material selected from the group consisting of liquid sulfur trioxide and oleum of at least about 80% strength which comprises adding thereto in an amount at least effective to stabilize the sulfur trioxide and oleum but not more than 2% by weight of an oxygenated aromatic compound selected from the group consisting of quinone, fluorenone and compounds of the formula $$Ar-X_n$$

wherein Ar is an aryl hydrocarbon nucleus of 6 to 14 ring carbon atoms and the alkyl of 1 to 4 carbon atoms and alkoxy of 1 to 4 carbon atoms derivatives thereof, X is selected from the group consisting of phosphonic, sulfonic, hydroxy and —COR wherein R is selected from from the group consisting of hydrogen, hydroxy, alkyl of 1 to 4 carbon atoms, phenyl, and alkoxy of 1 to 4 carbon atoms, and $n$ is an integer of from 1 to 14, and the anhydrides of the compounds of the said formula when X is —COR and R is hydrogen.

16. The method of stabilizing material selected from the group consisting of liquid sulfur trioxide and oleum of at least about 80% strength which comprises adding an oxygenated aromatic compound thereto, separating sulfur trioxide from the resulting mixture and adding some of the residue remaining after the separation of the sulfur trioxide to the material to be stabilized, the total amount of said aromatic compound added being in an amount at least effective to stabilize the sulfur trioxide and oleum but not more than 2% by weight based upon the weight of the finally stabilized composition, said oxygenated aromatic compound being selected from the group consisting of quinone, fluorenone and compounds of the formula $$Ar-X_n$$

wherein Ar is an aryl hydrocarbon nucleus of 6 to 14 ring carbon atoms and the alkyl of 1 to 4 carbon atoms and alkoxy of 1 to 4 carbon atoms derivatives thereof, X is selected from the group consisting of phosphonic, sulfonic, hydroxy and —COR wherein R is selected from the group consisting of hydrogen, hydroxy, alkyl of 1 to 4 carbon atoms, phenyl, and alkoxy of 1 to 4 carbon atoms, and $n$ is an integer of from 1 to 14, and the anhydrides of the compounds of the formula when X is —COR and R is hydrogen.

17. A stabilized composition consisting essentially of material selected from the group consisting of liquid sulfur trioxide and oleum of at least about 80% strength, said material having been stabilized by the addition thereto of an amount at least effective to stabilize the sulfur trioxide and oleum but not more than 2% by weight of an oxygenated aromatic compound selected from the group consisting of quinone, fluorenone and compounds of the formula $$Ar-X_n$$

wherein Ar is an aryl hydrocarbon nucleus of 6 to 14 ring carbon atoms and the alkyl of 1 to 4 carbon atoms and alkoxy of 1 to 4 carbon atoms derivatives thereof, X is selected from the group consisting of phosphonic, sulfonic, hydroxy and —COR wherein R is selected from the group consisting of hydrogen, hydroxy, alkyl of 1 to 4 carbon atoms, phenyl, and alkoxy of 1 to 4 carbon atoms, and $n$ is an integer of from 1 to 14, and the anhydrides of the compounds of the formula when X is —COR and R is hydrogen.

18. A composition of matter comprising liquid sulfur trioxide having had added thereto a minor amount but not more than 2 weight percent of an aromatic sulfonic acid.

19. The composition of matter comprising liquid sulfur trioxide having had added thereto 0.1 to 2 weight percent of an aromatic sulfonic acid.

20. A composition of matter comprising liquid sulfur trioxide having had added thereto a minor amount but not more than 2 weight percent of p-toluene sulfonic acid.

21. A composition of matter comprising liquid sulfur trioxide having had added thereto 0.1 to 2 weight percent of p-toluene sulfonic acid.

References Cited in the file of this patent
UNITED STATES PATENTS

| | | |
|---|---|---|
| 1,942,386 | Stoesser | Jan. 2, 1934 |
| 2,240,935 | Lepin | May 6, 1941 |
| 2,868,624 | Shaver et al. | Jan. 13, 1959 |